June 5, 1951  W. T. GOLLWITZER  2,555,740
TENS-CARRY MECHANISM FOR CALCULATING MACHINES
Original Filed June 12, 1946  7 Sheets-Sheet 4

Inventor:
Walter T. Gollwitzer,
By: Wallace and Cannon
Attorneys

June 5, 1951 W. T. GOLLWITZER 2,555,740
TENS-CARRY MECHANISM FOR CALCULATING MACHINES
Original Filed June 12, 1946 7 Sheets-Sheet 5
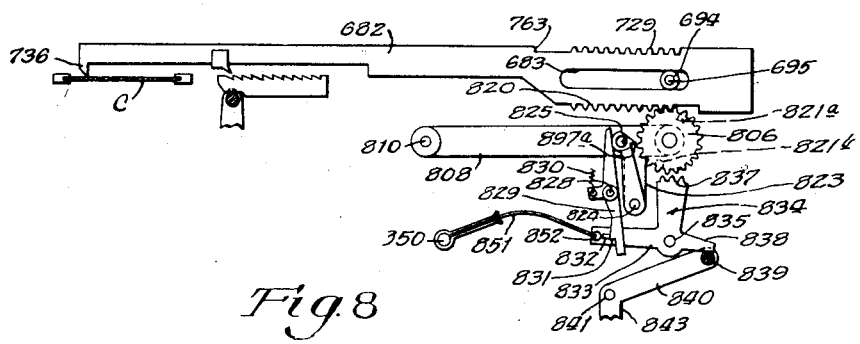
Fig.7
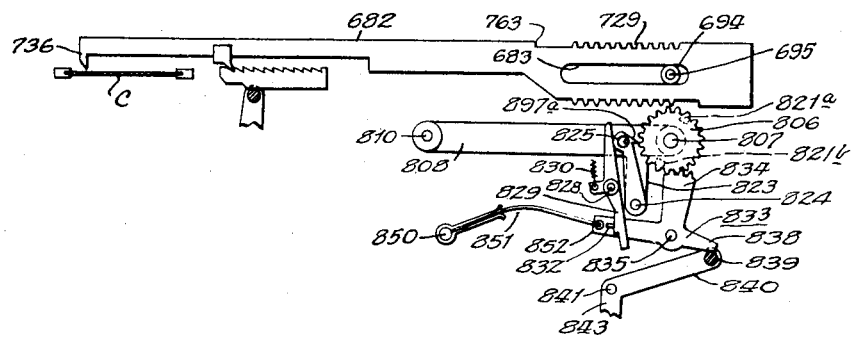
Fig.8
Fig.9 Fig.10 Fig.11
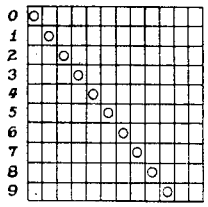
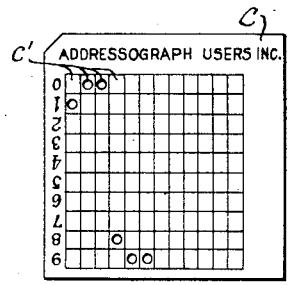
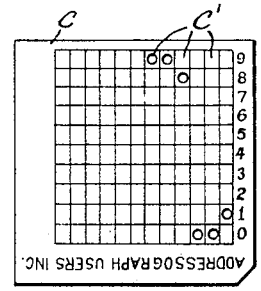
Inventor:
Walter T. Gollwitzer
By Wallace and Cannon
Attorneys INVENTOR.
Walter T. Gollwitzer
BY
Wallace and Cannon
ATTORNEYS INVENTOR.
Walter T. Gollwitzer
BY
Wallace and Cannon
ATTORNEYS Patented June 5, 1951

2,555,740

UNITED STATES PATENT OFFICE 2,555,740

TENS-CARRY MECHANISM FOR CALCULATING MACHINES

Walter T. Gollwitzer, Euclid, Ohio, assignor to Addressograph-Multigraph Corporation, Wilmington, Del., a corporation of Delaware Original application June 12, 1946, Serial No. 676,329, now Patent No. 2,501,444, dated March 21, 1950. Divided and this application January 2, 1948, Serial No. 277

3 Claims. (Cl. 235—137)

This application is a division of my copending application Serial No. 676,329, filed June 12, 1946, now Patent Number 2,501,444, issued March 21, 1950 and insofar as the divided subject matter covered in the present application is concerned, said application Serial No. 676,329 was a continuation in part of my application Serial No. 443,119, filed December 15, 1941, now abandoned which was in turn a division of my application Serial No. 221,841, filed July 28, 1938, and now issued as Patent No. 2,296,277, patented September 22, 1942.

This invention relates to accumulators and particularly to tens-carry mechanisms therefor.

The primary object is to enable tens-carry mechanisms for accumulators to be rendered extremely rugged and positive in their operation, and to so construct and arrange such tens-carry mechanisms that the restoring of the mechanisms may be readily accomplished even when the accumulator is of large capacity. Further and related objects are to utilize restoring means of a tens-carry mechanism in a novel manner so as to simplify the accumulator structure as a whole.

Other and further objects of the present invention will be apparent from the following description and claims and are illustrated in the accompanying drawings which, by way of illustration, show preferred embodiments and the principles thereof and what I now consider to be the best mode in which I have contemplated applying those principles. Other embodiments of the invention embodying the same or equivalent principles may be used and structural changes may be made as desired by those skilled in the art without department from the present invention and the purview of the appended claims.

In the drawings:

Fig. 3A is a perspective view of one of the accumulator wheels;

Figs. 4 to 8 are diagrammatic views showing progressive operations and positions of the accumulator parts;

Fig. 9 is a view showing a code whereby cards may be perforated for setting and controlling the mechanism;

Figs. 10 and 11 are views of such a card;

Figure 1:
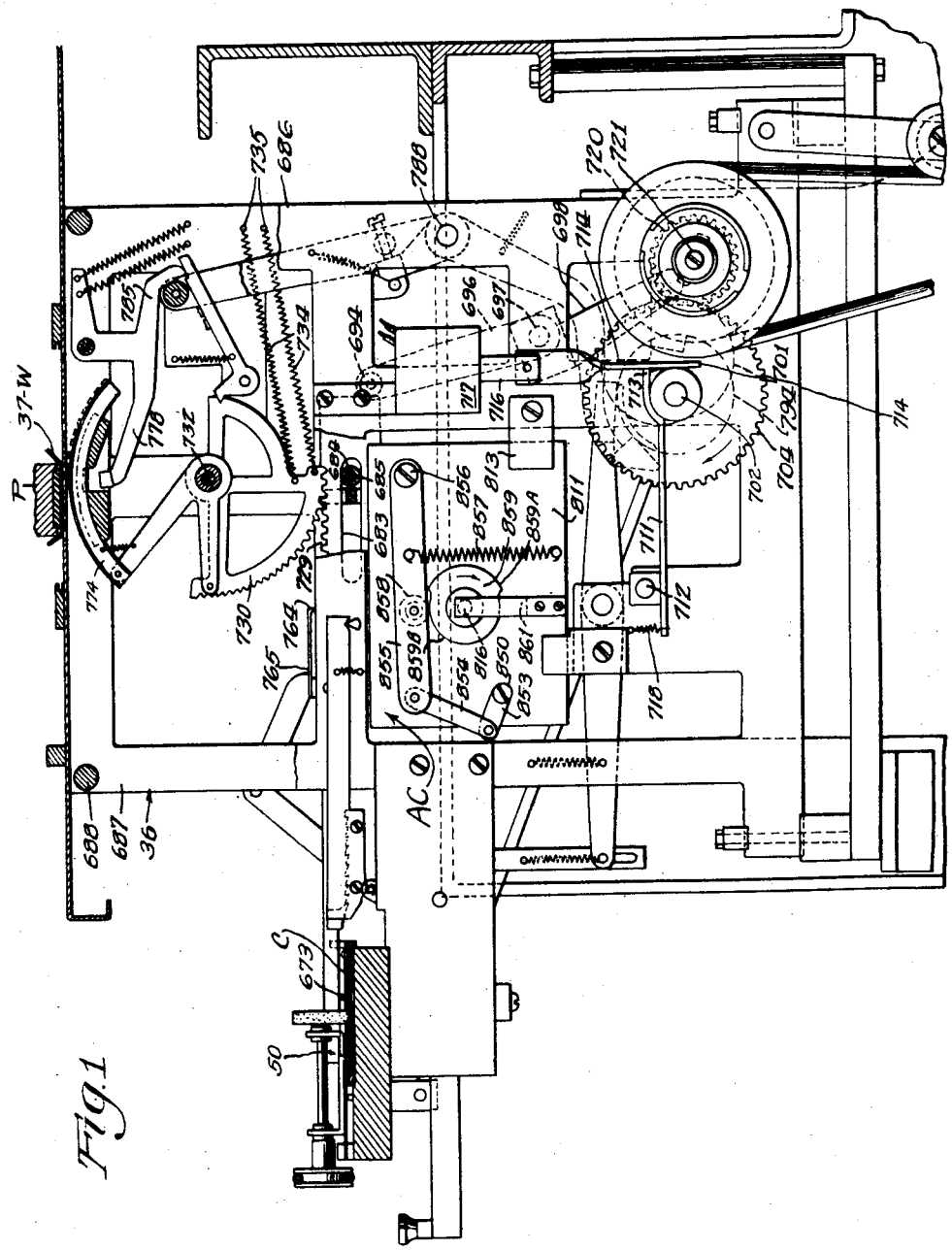
Fig. 1 is a side elevational view showing a variable printing unit with which an accumulator embodying the invention is associated.

In the form illustrated in Figs. 1 to 8 of the drawings, the invention is embodied in an accumulator AC that is utilized in association with a variable printer unit 36. This variable printer 36 has a platen P associated therewith so that a proof sheet or web 37—W may be passed beneath the platen P to have numerical amounts printed thereon by the variable printer. Such numerical amounts may constitute individual items derived from perforated data cards C, Figs. 10 and 11, and such amounts are added in the accumulator AC to produce totals, and such totals may be read out in such a way as to cause the variable printer 36 to print such total on the proof sheet 37—W.

As explained in my aforesaid patent, the cards C passed into the card guideway G move into engagement with a suitable stop finger which arrests movement of the cards and disposes them in position to cooperate with the sensing means 50 of the auxiliary printing mechanism 36. When a card C comes to rest in engagement with the stop finger it is, as has been stated, in position to be sensed by the sensing means 50 of the auxiliary printing mechanism 36, such sensing means 50 in the present instance including a plurality of sensing bars 682, Figs. 1, 2 and 3. There is a sensing bar 682 for cooperation with each column C', Figs. 10 and 11 on the cards C, in which columns digit representing perforations are provided.

Figure 2:
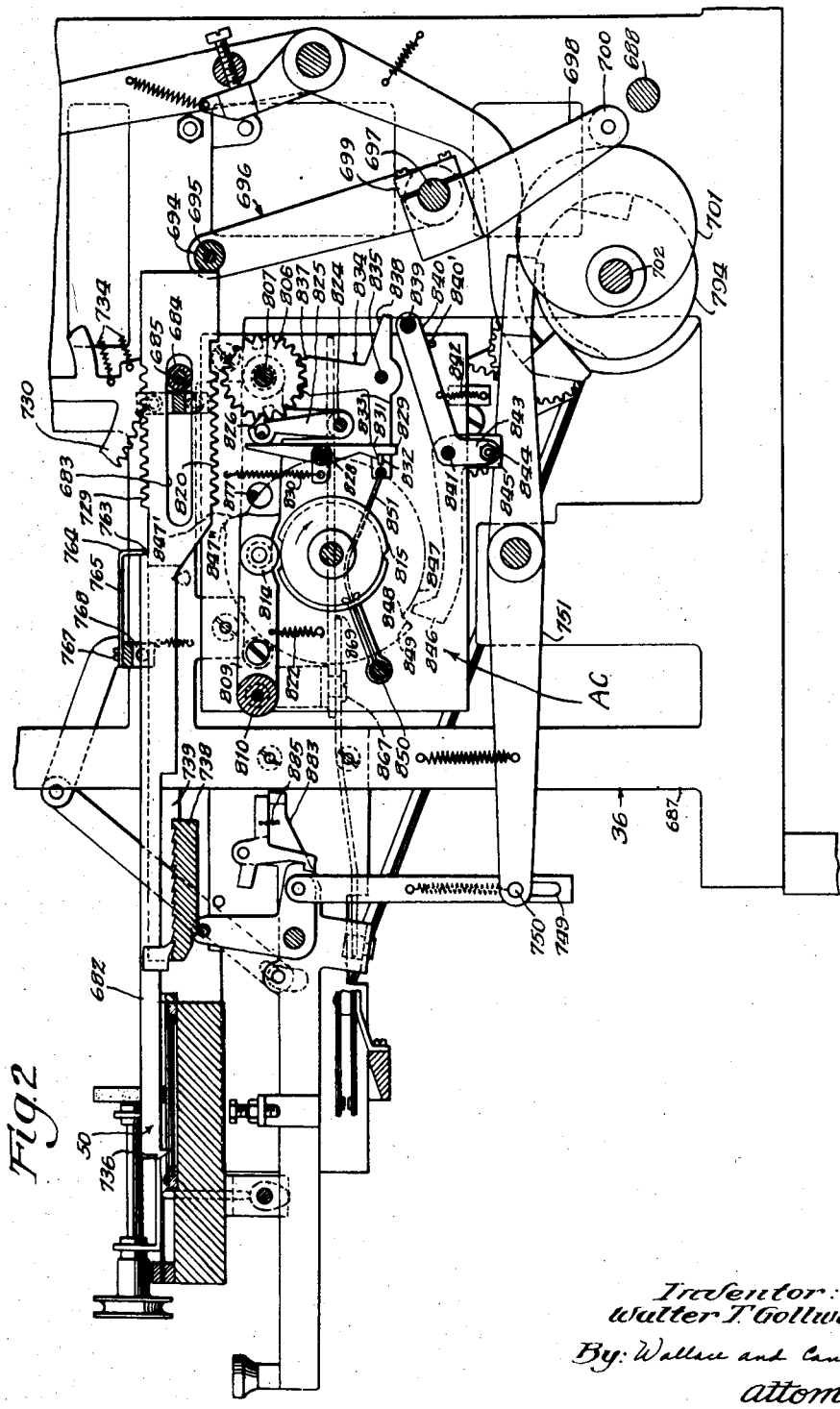
Figs. 2 and 3 are vertical sectional views thereof showing the parts of the accumulator in different positions.
Figure 3:
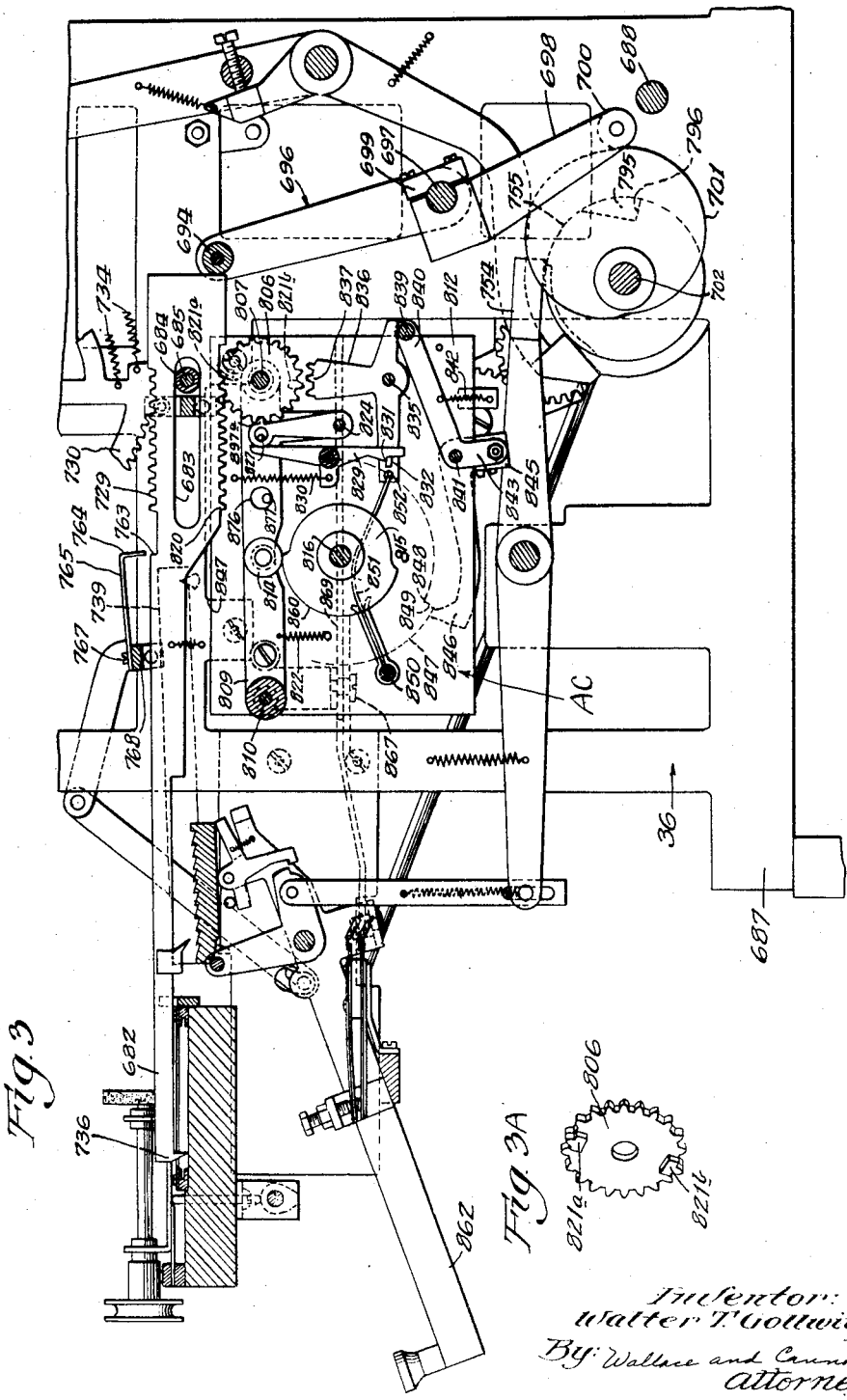

The sensing bars 682, as shown in Figs. 2 and 3, have enlarged portions at their inwardly disposed ends, and slots 683 are formed in these enlarged portions. A roller as 684 is mounted in each slot 683, these rollers 684 being rotatable on the shaft 685 which is fast in the side plates 686 and 687 of the auxiliary printing mechanism 36.

The sensing bars 682 are reciprocated in each operation of the auxiliary printing mechanism 36 and, for the purpose of imparting such reciprocatory movement to these bars, a roller 694 is extended past the inner ends of the sensing bars, and in a manner explained presently, springs act on the sensing bars to maintain the ends thereof engaged with the roller 694. This roller is mounted on a shaft 695 carried by a double-armed rocker 696 fast to the shaft 697 journaled in suitable bearings in the side plates 686 and 687. A depending arm 698 is clamped to the shaft 697 by a clamp block 699, Fig. 2, so as to afford an adjustable connection between this arm and the shaft 697. The arm 698 has a roller 700 mounted at the free end thereof and this roller bears against the periphery of a cam 701 fast on a drive 702 suitably journaled in bearings in the side plates 686 and 687, the roller 700 being urged into engagement with the periphery of the cam 701 by the aforesaid springs acting on the sensing bars 682.

Rotary movement is imparted to the shaft 702 through a clutch, such as is disclosed in my United States Patent No. 2,265,133, dated December 9, 1941. This clutch, Fig. 2, is arranged to be stopped or disconnected at the end of a single revolution by a stop arm 711 pivotally mounted as indicated at 712 on the side plate 687. As best shown in Fig. 1, a lug 713 on an arm 714 is normally disposed beneath the free end of the arm 711. The arm 714 is pivotally connected at 715 to the core 716 of a solenoid 717 which when it is energized attracts its core and thereupon the arm 714 moves upwardly and in the course of this movement the lug 713 engages the free end of the plate 711 and pivots this plate upwardly whereupon clutch becomes engaged. Thereupon the shaft 702 is connected to the gear 704 to rotate therewith, said gear being constantly rotated in the course of operation of the machine. The clutch is again disengaged at the end of a single cycle as explained in my aforesaid Patent No. 2,265,133.

In the course of each rotation of the shaft 702, induced by energization of the solenoid 717, the cam 701 acts on the roller 700 and through the arm 698 to rock the shaft 697 and therefore the rocker 696 which in such an event moves in a clockwise direction, as viewed in Fig. 2, at the start of an operation. Each sensing bar 682 has a rack 729 formed in the upper edge thereof and such racks mesh with gear segments 730 that are connected to type segments 744 that are mounted on a shaft 733 fast in the side plates 686 and 687. Springs as 734 extend between each gear segment as 730 and pins as 735 extended between the side plates 686 and 687. It is the action of the springs as 734 on the gear segments as 730 through the racks as 729 which is effective to engage the sensing bars 682 with the roller 694 and this spring pressure is effective through the rocker 696, shaft 697 and arm 698 to hold the roller 700 in engagement with the periphery of the cam 701.

At the time the rocker 696 starts to move clockwise, as viewed in Fig. 2, the gear segments 730 are positioned relative to the rack 729 in the manner shown in Fig. 1 and in the course of the advancing movement of the sensing bars 682 induced by the clockwise movement of the rocker 696, the gear segments 730 move relative to the rack 729 into set positions. The position which the gear segment 730 will assume in the course of such forward movement of the sensing bars 682 is determined by the position attained by these bars in the course of advancing movement thereof, and such position of the sensing bars is determined by the cooperation thereof with perforations in the card C that is being sensed.

Each sensing bar 682 includes a sensing nose 736 and at the initiation of a sensing operation such noses rest on a card C, engaged with the stop finger 674, substantially in alignment with the first row of perforation receiving positions which, as stated heretofore, is the position whereat perforations representative of zero are made and, therefore, if a card C has a perforation in a particular column in this zero position the sensing noses 736 will pass into such perforation very soon after the bars 682 move toward the right, as viewed in Fig. 2, which is induced by clockwise movement of the rocker 696, as viewed in said Fig. 2. When the sensing bars 682 sense a perforation in a card C, they come to rest and are accurately positioned in a manner disclosed in my aforesaid parent application, and the positions of the respective sensing bars are at this time representative of the digits sensed from the card C.

Particularly because of the inclusion in the auxiliary printing mechanism 36 of an accumulator, as will be described presently, it is also essential, where more sensing bars 682 are provided than there will be perforations in columns to be sensed, as in the present instance where perforations will appear only in six columns and nine sensing bars 682 are provided, that means be provided for preventing those sensing bars 682, which will in no instance cooperate with perforations, from making a sensing movement for otherwise, if these bars were permitted to make a sensing movement, false figures would be entered into and accumulated in the accumulator and to prevent this the following arrangement is provided.

A notch as 763 is provided in the top edge of each sensing bar 682 and is engageable by the depending portion 764 on a plate 765 through which a screw 767 is extended, the head of this screw overlying the marginal portions about the slot and serving to clamp the part 765 against the top surface of a bar 768 that extends between and is pivotally mounted on the side plates 686 and 687. The aforesaid slidable mounting of the plate 765 enables it to be moved transversely across the sensing bars 682, and the depending portion 764 is moved into the notches 763 in those sensing bars which will not in any circumstance cooperate with perforations in a card C which in the present instance will be the three lowermost sensing bars 682, it being remembered that nine such bars are provided but only six thereof are to be effective in the present instance since perforations will be provided in only six columns on the card C. The pivotal mounting of the bar 768 enables this bar to be pivoted to retract the depending portion 764 from the notches 763 in a total taking operation of the accumulator.

The sensing bars 682 as has been explained cooperate with gear segments as 730, and in the course of the sensing movement of the sensing bars 682 the gear segments 730 are to be rotated about their pivotal mountings on the shaft 733 in an amount corresponding to the distance travelled by the respective sensing bars with which the gear segments 730 respectively cooperate and hence the respective gear segments are moved in an amount corresponding to the respective amount of movement of the sensing bars as 682. Such movement of the gear segments 730 is utilized in the present instance to control the set-up of the type segments from which impressions are made onto the web 37W that is to be divided into pages which constitute the proof sheet and in order to effect such positioning of such type segments the following arrangement is provided.

Figure 4:
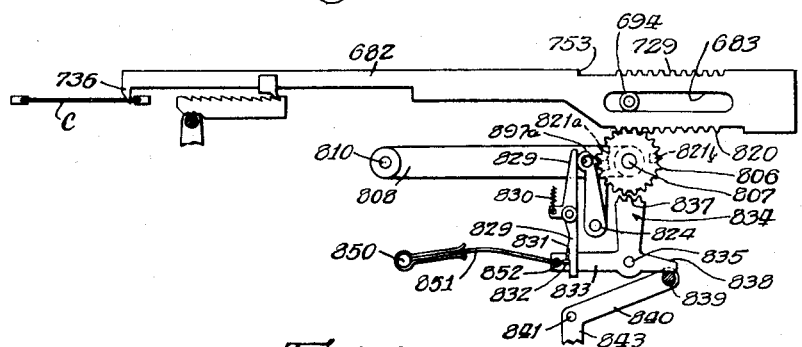
Figure 6:
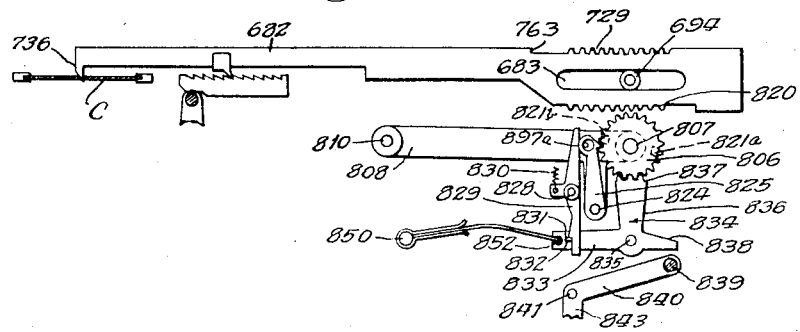

Arms as 772 are unitary with the arms 769 and these arms are pivotally connected as indicated at 773, Figs. 4 and 6, to the type segments as 774, springs as 775 extending between the arms as 772 and the type segments as 774 and serving to tightly seat the type segments in the arcuate slots 775' formed in the top of the block 776 mounted between and connected to the side plates 686 and 687. The disposition of the type segments 774 in the slots 775' affords a slidable mounting for these type segments, which, it will be understood have type characters provided on the top surface thereof. In the present instance the type characters provided on the top edges of the type segments 774 are for printing the digits and they are arranged in the order of from 0 to 9, the zeros being aligned with the printing position below the platen P when the type segments are in their normal at rest position shown in Fig. 3. The advancing movement of the sensing bars 682 acts through the gear segments 739 to move the type segments 774 with the sensing bars 682 and thereby in correspondence with the positions at which noses 736 on the sensing bars 682 come to rest, type characters are disposed in printing position below the platen P as, for example, where a sensing nose 736 passes through a perforation representative of the digit 4 the type character on the connected type segment 774 for printing the digit 4 comes to rest in printing position.

The platen P, in so far as making impressions from the type characters on the type segments 774 is concerned, serves as a backing member when impressions are made from the type characters on the type segments, such impressions being made by the action of hammer mechanism 778 and associated zero suppressing means as described in detail in my aforesaid parent application.

As has been stated heretofore, the auxiliary printing mechanism 36 includes an accumulator AC in which totals of the amounts printed on the proof sheet 37 from the type characters on the type segments 774 are accumulated, and this accumulator is of such construction that at desired times this accumulator is of such that it may be operated to set up the type segments 774 whereby totals accumulated in the accumulator may be printed on the proof sheet 37—W.

This accumulator AC includes a plurality of accumulator wheels 806, Figs. 2 to 8, there being an accumulator wheel 806 for each sensing bar 682. These accumulator wheels 806, in the present instance, are in the form of gears and are totally mounted on shouldered collars, these collars each including a shoulder of sufficient thickness to accommodate an accumulator wheel. The collars are mounted on a shaft 807 about which therefore the accumulator wheels 806 are supported for rotation, the shaft 807 being fast to the outer ends of the arms 808 and 809 which are pivotally mounted on spacing collars carried by a shaft 810 which in turn is carried by the side plates 811 and 812 of the accumulator unit. The side plate 812 is directly fastened to the inner face of the side plate 687 and lugs as 813, provided on the side plate 811, are detachably connected to the side plate 686, this mounting for an accumulator unit AC, the various parts of which are carried by the side plates 811 and 812.

The arms 809 are connected together to move as a unit and mounted therebetween substantially midway in the extent thereof is a roller 814 that may ride on the periphery of a cam 815 fast on a shaft 816 journaled in the side plates 811 and 812. Gearing means serve to connect the shaft 702 as shown in my aforesaid patent so that each time the shaft 702 is set in rotation in the manner hereinabove described, the cam shaft 816 is caused to make a complete revolution, the ratio between the gears being such that the shaft 816 rotates synchronically with the shaft 702.

In the course of rotation of the cam 815 with the cam shaft 816, a rise on this cam engages the roller 814 and pivots the arms 809 in such a manner that the accumulator gear wheels as 806 are respectively engaged with the racks 820 on the lower edges of the sensing bars 682, each accumulator gear wheel 806 being respectively aligned with a rack 820. The gear wheels 806 are so engaged with the racks 820 immediately after the rocker 696 has reached the end of its clockwise motion, as it is viewed in Fig. 2 at which time all of the sensing bars 682 which are free to move under the influence of the springs 734 will have attained the positions in which they are to stop by reason of noses 736 thereon having moved through perforations in the particular columns on the card C with which the noses 736 cooperate or, in other words, the sensing bars 682 will be positioned to represent a digital count by the time the gear wheels 806 mesh therewith. Moreover, by the time the gear wheels 806 are meshed with the racks 820 the hammers 778 will have been freed to the action of the springs 782 and an impression operation from the type characters set up will be made.

The parts are so timed that immediately after the impression operation effected by the hammers 778 is completed the rocker 696 starts to move counterclockwise, as viewed in Fig. 2, and in the course of this counterclockwise movement the roller 694 comes into engagement with the ends of the sensing bars 682 that have been arrested in positions representative of significant digits and after the roller has moved into engagement with the ends of these bars the bars thereafter move with the rocker 696 and return to their initial or zero positions. Hence, since the sensing bars have been set up to represent a digital count, as the accumulator gear wheels 806 are by this time meshed with the racks 820, it follows that in the return of the sensing bars 682 rotation is imparted to the gear wheels 806 in an amount proportionate to the digital count to which the respective sensing count represented by the sensing bars 682 will be transferred to the accumulator wheels 806.

It will be manifest that as various digital values are entered into the accumulator wheels, more than ten digits will be entered onto a particular wheel and as the tenth digit is entered into a particular wheel it is necessary that a carry-over be made into the order next high than that to which a particular wheel pertains, and hence an arrangement, now to be described, is provided which will effect such carry-over.

Each accumulator gear wheel 806 has twenty teeth thereon and teeth at diametric positions thereon, which is to say, each of the teeth pertaining to 10 is thickened, as best illustrated in Fig. 3A where such thickened teeth are indicated by 821a and 821b. Immediately after the sensing bars 682 attain their forwardmost or zero positions, the roller 814 rides off the rise on the cam 815, and thereupon the arms 808 and 809 are pivoted downwardly under the influence of the spring 822 which so acts on these arms that the roller 814 is urged toward the periphery of the cam 815. In this lowering movement the accumulator gear wheels 806 are demeshed from their cooperating racks 820 and are disposed in a lowered position such as is shown in Fig. 2. A lug as 823, Figs. 4 to 7, depends from each of the arms 808 and 809 adjacent the shaft 807, and a shaft 824 extends between these lugs and dogs as 825 are pivotally mounted on this shaft 824, there being a dog 825 at the side of each accumulator wheel 806 to lie in the line of movement of the thickened portions of the teeth 821a and 821b. The dogs 825 have relatively enlarged openings 826 therein near the upper ends thereof and a rod 827, carried by the arms 808 and 809, extends through all of the openings 826 to limit the pivotal movement thereof about the shaft 824.

Another shaft 828 extends between the side plates 811 and 812 and mounted at spaced intervals therealong are pawls as 829, there being a pawl 829 in alignment with each dog 825. Springs 830 are effective on the pawls 829 to engage the upper ends of these pawls with the dogs 825 and to urge the shoulders as 831 on the lower ends of the pawls into engagement with the lugs as 832 on the arms 833 of the carry segments generally indicated by 834 which are mounted on a shaft 835 that extends between the side plates 811 and 812, there of course being a carry segment 834 including an upstanding arm 836 having a gear segment 837 at the free end thereof, the gear segments 837 being respectively adapted to mesh with the accumulator gear wheels 805. Each carry segment 834 also includes an arm 838 which projects above a pin 839 carried by the arms as 840 of a rocker pivotally mounted on the shaft 841 that is carried by the side plates 811 and 812. A spring 842 is effective on the arms as 840 to urge these arms and therefore the pin 839 downwardly as the parts are viewed in Fig. 2.

An arm 843 depends from the arm 840 mounted adjacent the side plate 812 and a screw 844, Fig. 2, tapped in this arm extends below this side plate and is passed into an opening on the arm 845 that is pivotally mounted on the shaft 841 outwardly of the side plate 812, this arm being unitary with a cam follower 846, the spring 842 being effective to urge this cam follower toward the periphery of a cam 847 fast on the shaft 816, the periphery of which cam has a notch 848 therein, one end of which notch is defined by a radial edge 849 at the end of a dwell on the periphery of this cam.

A shaft 850 is journaled in the side plates 811 and 812 and a comb spring 851 is fast thereon intermediate these side plates, the free ends of the teeth of this comb spring being respectively engaged in bifurcations 852 provided at the free ends of the arms 833 of the carry segments 834 so that each tooth of the spring 851 is effective on a particular carry segment. It is the spring 851 which supplies power to effect the entry of carries in a manner that will be described presently and in the course of a restoring operation, which will also be described presently, it would be necessary to overcome the effective force of this spring were it not for the fact that I provide an arrangement whereby the spring 851 is strongly tensioned only at the time they are to be effective to cause the entry of carries, and at all times this spring is only lightly tensioned and to this end the following arrangement is provided.

An arm 853, Fig. 1, is fast on the shaft 850 and a link 854 is connected thereto, this link also being connected to one end of a rocker 855 which is pivotally mounted as indicated at 856 on the outer face of the side plate 811, a strong spring 857 being effective on the rocker 855 and urging the roller 858 thereon toward the periphery of a cam 859 fast on the cam shaft 816. At the time a carry is to be entered, the roller 858 rides onto a drop on the cam 859 and rides from an outer dwell 859A of the cam 859 onto a lower dwell 859B thereof, whereupon through the link 854 and the arm 853 the shaft 850 tends to rotate counterclockwise, as it is viewed in Figs. 1 and 2, and in this operation the full effect of the strong spring 857 is impressed on the comb spring 851, it being understood that, when the roller 858 rides on the upper dwell 859A of the cam 859, the spring 857 is only partly effective on the spring 851 which is at such times only lightly tensioned. The increased tension impressed by the strong spring 857 on the spring 851 is maintained until the accumulator wheels 806 are meshed with their aligned racks 820, in the manner above described, but as soon as this is effected the dwell 859A on the cam 859 engages the roller 858 and thereupon the spring 857 is only partly effective on the spring 851 wherefore the tension of this spring is reduced so that a restoring operation may be effected without being required to overcome strong tension of the spring 851.

When an accumulator wheel 806 is in one of its two zero positions, either the wide teeth 821a or 821b is located with respect to the dog 825 in the position in which the tooth 821a is shown in Fig. 4 which is positioned immediately beyond that in which the tooth 821a would be effective, upon movement of the accumulator wheel 806 counterclockwise, as viewed in Fig. 4, to pivot the dog 825. In this position the springs 830 act through the pawls 829 to engage the dogs 825 with the rod 827 in the manner shown in Fig. 3 which positions the dogs 825 in the most right-hand position thereof, as they are viewed in this Fig. 2. The nose 736 on the sensing bar 682 shown in Fig. 4 has passed through a perforation in the card C representative of 9 and the accumulator gear wheel 806 has been meshed with the rack 820 by reason of upward movement imparted to the arms 808 and 809 in the manner hereinabove described and, therefore, in Fig. 4 the parts are shown in the positions occupied thereby immediately prior to the time the rocker 696 starts its counterclockwise movement as viewed in Fig. 3.

Figure 5:
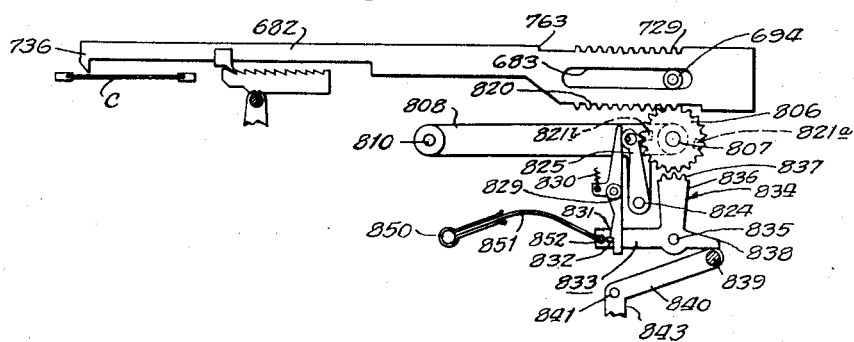

In Fig. 5 the parts are shown in the position attained thereby at the time the sensing bars 682 have attained their forwardmost position and by this time the roller 737 will have moved into engagement with the bottom face of the block 738 and will have pivoted this block upwardly so as to insure that the nose 736 will be disengaged from a card C whereby a card may be fed from position beneath the noses 736 by means being described hereinafter. As the sensing bar 682 moves from the position shown in Fig. 4 into the position in which it represents the digit 9 to the point wherein it represents zero and in so doing will have rotated the accumulator gear wheel 806 meshed with the rack 820 on this particular sensing bar in an amount representative of nine digits and by referring to Figs. 4 and 5 it may be seen that in Fig. 5 the wide tooth 621b is advanced into a position wherein it will engage the dog 825 as soon as further movement is imparted to the accumulator gear wheel 806, such positioning of the accumulator gear wheel 806 being equivalent to a representation of 9.

Immediately after the parts attain the post positions thereof shown in Fig. 5, the roller 814 rides off the rise on the cam 815 and thereupon the accumulator gear wheels 806 disengage the aligned racks 820 and move in to a lower position wherein the teeth of these gears engage the teeth of the gear segments 837, such engagement of these teeth being shown in Fig. 6, which shows the movably mounted parts in the lower position attained thereby when the wheel 806 is disengaged from the rack 820.

In Fig. 6 the nose 736 on the illustrated sensing bar 682 is shown as having passed through a perforation in a card C representative of the digit 4, this card being the one succeeding that shown as having passed in Fig. 4, and the sensing bar 682 as illustrated in Fig. 6 is in a position representative of a digital count of four, this position having been attained when the rocker 696 moved clockwise, as it is viewed in Fig. 2. Prior to the time the rocker 696 starts its return or counterclockwise movement, as it is viewed in Fig. 2, the illustrated accumulator gear wheel 806, as well as all others, will be pivoted back up into engagement with the aligned rack 820 and then as the sensing bar 682 returns from the position in which it is shown in Fig. 7 the digital count of four, which will be entered on the accumulator gear wheel 806 wherefore this wheel will have advanced in an amount equivalent to the representation of four digits, in which position it is shown in Fig. 7.

In the course of the advancing of the wheel 806 from the position in which it shows in Fig. 6 into the position in which it is shown in Fig. 7, the wide tooth 821b engaged the tapered nose at the upper end of the illustrated dog 825 and pivoted this dog counterclockwise as it is viewed in Fig. 7. Such pivotal movement of the illustrated dog 825 is effective on the upper end of the illustrated pawl 829 to pivot the shoulder 831 thereon from engagement with the lug 832 on the arm 833 of the illustrated carry segment 834. This frees the carry segment 834 of its latch connection with the pawl 829 for a very slight movement to the unlatched relation of Fig. 7, but this movement is slight in practice that the teeth of the gear segment 837 are maintained in substantially the same relation with the teeth of the accumulator wheel 806 with which they cooperate as these teeth would have occupied had not the shoulder 831 been disengaged from the lug 832.

The dog 825 and cooperating pawl 829 shown in Figs. 4 to 7, inclusive, cooperate with the accumulator wheel 806 which pertains to the lowermost or units order. The carry segment 834 however shown in these views, while it is under control of the aforesaid dog and pawl, is aligned with the next high accumulator wheel 806 or, in this instance, the accumulator wheel 806 which pertains to the tens order.

When the accumulator wheel 806 with which the dog 825 cooperates advanced from the position in which it is shown in Figs. 5 and 6 into the position in which it is shown in Fig. 7, four digits were added to the nine already standing therein so that when the accumulator wheel 806 attains the position in which it is shown in Fig. 7 it is representing "13." However, this accumulator wheel is only capable of representing the digits appearing in a single order so that when the accumulator wheel 806 advanced from the "9" position thereof shown in Fig. 6 into the "3" position thereof, it was necessary to carry the "1" in the tens order of "13" into the next high or tens order. It was for this purpose that the shoulder 831 was disengaged from the lug 832, and when this shoulder disengaged this lug the arm 838 of the carry segment pertaining to the tens order moved from a position substantially like that shown in Fig. 5 into engagement with the pin 839 to close the gap or clearance between the arm 838 with the pin 839, Fig. 7, and it is the engagement of the arm 838 with the pin 839 that maintains the teeth of the gear segment 837 in the proper relation with the teeth of the accumulator wheel 806 that pertains to the tens order, or, in other words, insures that upon lowering of the arms 808 and 809 a particular tooth on the accumulator wheel 806 pertaining to the tens order which would have engaged a particular tooth notwithstanding the delatching of the shoulder 831 from the lug 832.

Subsequent to the time the parts attain the position shown in Fig. 7 the arms 808 and 809 pivot downwardly in the manner above described and in the course of this downward pivotal movement the teeth on the accumulator wheel 806 move into meshing relation with the teeth of the gear segment 837 aligned therewith. By the time this intermeshing is established the roller 858 will have been ridden off the rise on the cam 859 and the arm 855 will have been freed to the action of the spring 857 which, as explained hereinabove, will be effective through the link 854 and the arm 853 to impress strong tension on the spring 851. Subsequent to the time the just described intermeshing of the accumulator wheel 806 pertaining to the tens order with the gear segment 837 aligned therewith has been established the radial edge 849 of the cam 847 moves from the position of Fig. 3 to the position of Fig. 2 so that the cam follower 846 drops past the radial edge 849 onto the inner dwell surface of the cam. Thus the arm 840 is moved by its spring 842 downwardly from the position shown in Fig. 3 into the position shown in Fig. 2, wherein it will be seen that in such movement of the arm 840, the spring 851 is effective through the arm 833 of the carry segment 834 to rock it from the position shown in Fig. 7 to the position in which it is shown in Fig. 8. Such movement of the carry segment is sufficient to advance the accumulator wheel 806 pertaining to the tens order in an amount equivalent to the representation of one digit thereon whereby the "1" of the above described entry of "13" is entered in tens order.

The above described operation of entering a carry into a next higher order occurs after the accumulation of any digital values that are to be accumulated in the order into which the carry is made and it also occurs prior to the end of a cycle of operation brought about by rotation of the shaft 702. Hence, by the time the shaft 702 comes to rest at the end of a cycle of operation the accumulator wheels stand in positions representative of whatever values were entered into in the course of such cycle of operation plus any values which were previously entered therein.

In the course of a cycle of operation succeeding that in which any carry or carries have been entered into the next higher order in the manner above described (it being understood that a carryover arrangement similar to that hereinabove described is associated with each lower order from which a carry may be made and with each higher order into which a carry may be entered), the carry segments which were rocked into the position which is shown in Fig. 8, to effect entry of such a carry, and the dog 825 which unlatched the pawl 829 to bring about such a carry operation are restored to the position thereof shown, for example, in Fig. 4, this being brought about as follows.

Shortly after the start of the cycle of operation succeeding that above described and subsequent to the time in such succeeding cycle at which the accumulator gear wheels 806 have been moved from the position such as that shown in Fig. 2 (wherein they are disengaged from the racks 820) into a position such as that shown in Fig. 3 (wherein they are engaged with the racks 820), the rise on the cam 859 engages the roller 858 and pivots the rocker 855 upwardly and the tension of the spring 851 is thereby lessened so that the strong tension applied thereon as above described need not be overcome by the restoring operation. The spring 851, however, remains effective on the carry segments 834 until the accumulator wheels 806 are effectively meshed with the racks 820 and in this way the accumulator wheels 806 are retained in whatever position into which they are advanced by reason of carry-over actions, it being apparent that such an arrangement insures accuracy of operation which is of course essential.

Immediately after the accumulator wheels 806 have been engaged with their aligned racks 820 and the spring 851 has been freed of strong tension in the manner described, the restoring operation of the carry-segments, and other parts that moved in the carry-over operation, is quickly effected and this is brought about by the engagement of the rise 847' on the cam 847 with the cam follower 846 which pivots the arm 840 counterclockwise, as viewed, for example, in Fig. 4, to dispose the pin 839 in the position in which it is shown in Fig. 4 which is slightly above the position in which this pin is shown in Fig. 5. When in this position the pin 839 acts through the arms 838 to so dispose the arms 833 that the lugs 832 are below all of the shoulders 831. Therefore, the pawls 829 are all freed to the action of their springs 830 and this insures that the shoulders 831 will be disposed in latching position above the lugs 832. It will be noted that the rise 847' on the cam 847 extends slightly beyond the outer dwell surface of the cam as at 847, and that is brief so that the nose 846 is quickly freed therefrom and when the nose 846 moves into engagement with the dwell of the cam 847 the pin 839 assumes the position in which it is shown in Fig. 5. This position of the pin is such that if a shoulder 831 is disengaged from a lug 832 the relationship between the teeth of the gear segment 837 of the freed carry segment will be maintained with the aligned gear 806, as has been described hereinabove. The just described restoring operation occurs intermediate the time the accumulator gear wheels 806 are engaged with their aligned racks 820 and the time the rocker 696 is effective on the sensing bars 682 disposed in positions representative of significant digits in the course of its counterclockwise movement as it is viewed in Fig. 2.

In the course of operation of the machine various amounts printed from the type segments 774 are accumulated on the accumulator gear wheels 806 and usually at the end of a predetermined set of operations, which is commonly referred to as the end of a run, it is desired to print the total of the amount that has been accumulated on the wheels 806, and to this end manually operable means are provided for causing the accumulator gear wheels 806 to be engaged with the racks 820 in such a way that the setting of the wheels 806 can be utilized to set the type segments 774 so that the total accumulated on the wheels may be printed therefrom.

Such total taking means are of course independent of the tens-carry aspects of the machine, and hence no specific description will be included concerning such total means. Reference may of course be had to my aforesaid parent case for details of such structure.

Figure 12:
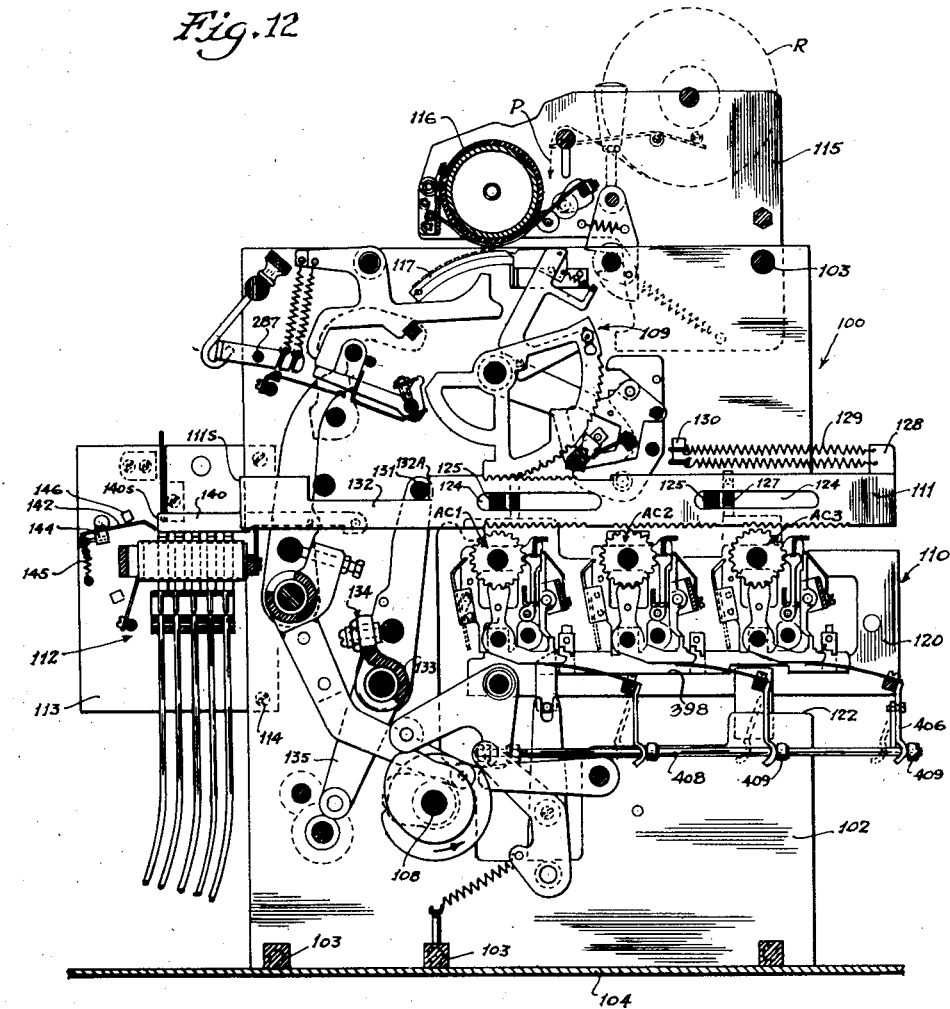
Fig. 12 is a vertical sectional view through an adding machine embodying a modified form of the invention.
Figure 13:
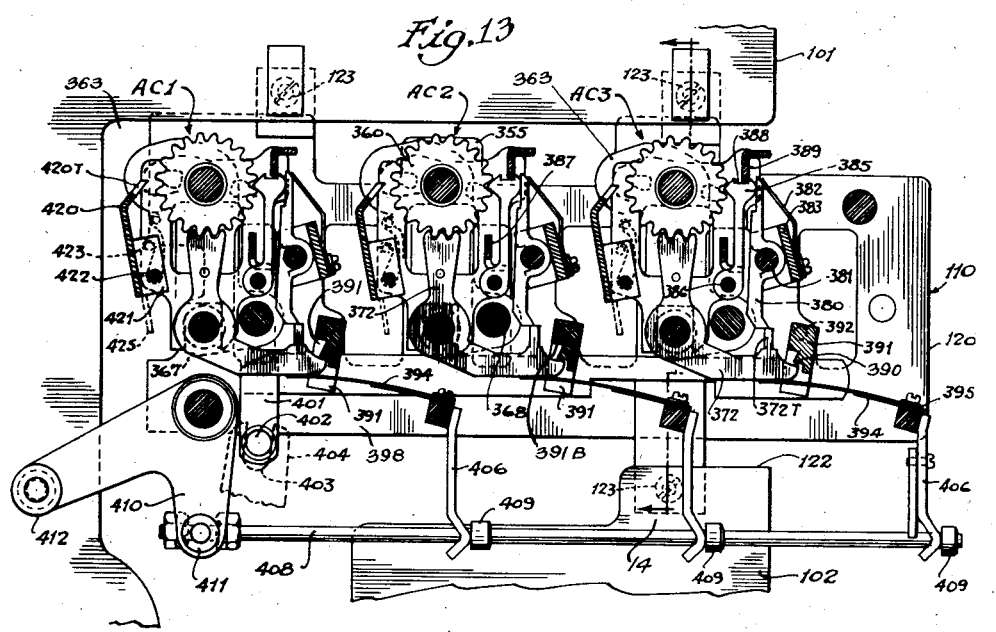
Fig. 13 is an enlarged view of the adding mechanism.
Figure 14:
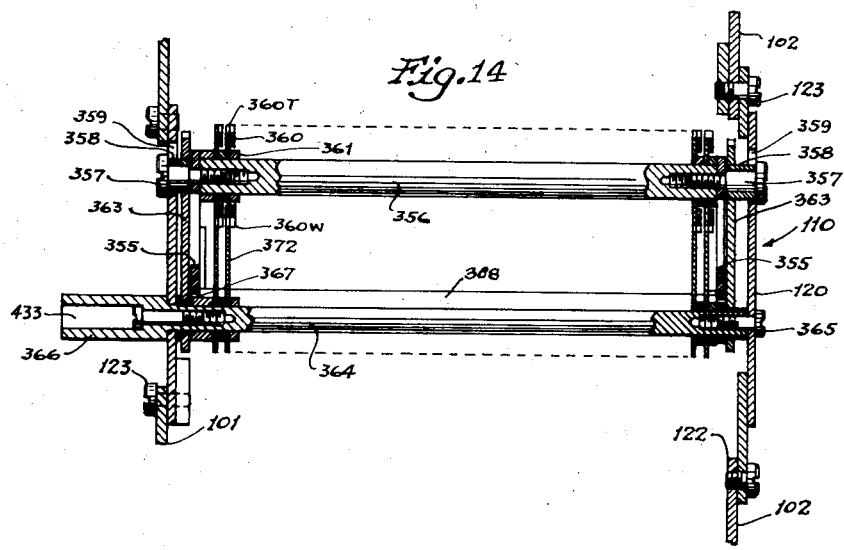
Fig. 14 is a sectional view taken along the line 14—14 of Fig. 13.

In Figs. 12 to 14 of the drawings I have illustrated a portion of the accumulator mechanism shown in Figs. 37 to 40 of the parent application, Serial No. 676,329, and this mechanism embodies many of the structural features and principles of the previously described mechanism, and in the form thus shown in Figs. 12 to 14, the accumulator is embodied in an adding machine 100 that is adapted for use in different commercial installations wherein numerical amounts are to be introduced automatically into the machine and wherein page totals and groups totals are to be taken and printed automatically in the course of operation of the machine. As will be evident in Figs. 12 to 14, the adding machine 100 embodies a frame having spaced side plates 101 and 102 that are rigidly associated in the desired spaced relation by a plurality of spacer bars 103. The frame that is thus afforded is adapted to be mounted as for example on a mounting plate 104 so that the side plates 101 and 102 are disposed in a vertical or upstanding relationship. The frame that is thus afforded also has another upstanding side plate 105 disposed to the left and in spaced relation with respect to the side plate 101 so that a main cam shaft 108 of the machine may be extended through and supported by the several plates 101, 102 and 105 near the lower edges thereof as will be evident in Fig. 12.

The adding machine 100 embodies a variable printing mechanism 109, Fig. 12 and accumulator mechanism 110, and the variable printing mechanism 109 and the accumulator mechanism 110 are adapted to be operated by a plurality of horizontally movable slides 111 that are mounted for reciprocating movement in a horizontal direction between the side plates of the frame. In the entry of numerical amounts into the variable printing mechanism 109 and the variable accumulator mechanism 110 the slides 111 are settable in accordance with the desired numerical amounts by set up mechanism 112 that is mounted forwardly of the frame by means of side plates 113 that are secured at 114 to the side plates 101 and 102. The setup mechanism 112 is under the present invention so constructed and arranged so as to be settable by means operating in accordance with the five-element code as described in detail in my aforesaid application Serial No. 676,329.

As will hereafter become evident, the setting movements of the slides 111, as such setting movements are governed by the setup mechanism 112, are utilized to set the variable printing mechanism 109 for printing the setup numerical amounts upon a strip of paper P that is withdrawn from a roll R carried in a paper feed mechanism 115, such web of paper P being advanced beneath a platen roller 116 so as to be disposed at the printing position over a plurality of settable type segments 117 that form part of the variable printing mechanism 109. It will be recognized of course that an inked ribbon is disposed between the web of paper P and the type segments 117 so that impressions may be made from the type segments on to the paper P in accordance with the set-up of the variable printing mechanism 109.

The movements of the slides 111 are also utilized to introduced numerical amounts into the accumulator mechanism 110, which as illustrated in Figs. 12 and 13 embodies three accumulators identified as AC1, AC2 and AC3. The three accumulators that are thus afforded are mounted as will hereinafter be described between a pair of relatively small side plates 120 and 121 thereby to afford a separate mounting for the accumulator unit 110, and the side plates 101 and 102 have relatively wide openings or slots 122 formed therein to extend forwardly from the rear edges of these side plates so that accumulator unit 110 may be moved forwardly into the slots 122 and into position beneath the slides 111. The unit 110 is then secured in position with respect to the main frame of the machine by means including a plurality of cap screws 123 as will be evident in Fig. 14 of the drawings.

The slides 111 have longitudinal slots 124 formed therein, and these slides are mounted for horizontal sliding movement on supporting bars 125 that are extended between the side frames 101 and 102, and one such slide 111 is afforded for each order of the accumulator. The several slides 111 are maintained in the desired spaced relationship on the supporting bars 125 by comb bars 127 that are also disposed so as to extend through the slots 124 and are connected to the side plates 101 and 102. At their rear ends slides 111 have upstanding ears 128 and springs 129 are extended from the ears 128 in a forward direction so as to be connected at their forward ends on anchoring bars 130 that are in turn supported by the side plates 101 and 102. The slides 111 are individually urged by the springs 129 in a forward direction from the normal or restored positions thereof shown in Fig. 12 of the drawings, and the forward or setting movements of the individual slide bars 111 are controlled by the set up mechanism 112. The slide bars 111 are returned to their normal or rest positions of Fig. 12 by a restoring bail 131, the cross bar of which is disposed within a slot 132 that is formed in the upper edges of all of the slide bars 111, and the slot 132 affords a rear end edge 132A that may be engaged by the cross bar of the bail 131 to move all of the slides 111 rearwardly to their restored positions. The restoring bail 131 is mounted on a rock shaft 133 and is adjustably connected thereto by means of a screw thread device 134. The rock shaft 133 has an arm 135 extended downwardly therefrom as shown in Figs. 12, and a cam roller 136 on the lower end of the arm 135 engages a restoring cam 137 fixed on the main cam shaft 108 of the machine. The cam 137 is of such a configuration that when the rotation of the cam shaft 108 is started from its initial or rest position, the bail 131 will be moved forwardly or in a counterclockwise direction as illustrated in Fig. 12, and this permits forward or setting movement of the slides 111 under control of the setup mechanism 112. After the slides 111 have thus been set up, and in the last half of the cycle of operation of the machine, the cam 137 rocks the restoring bail in a clockwise direction so as to thereby move the slides 111 into the normal or restored position of Fig. 12.

The forward or setting movements of the slides 111 are governed by the setup mechanism 112 so as to set the slides 111 in accordance with any desired numerical amount that is to be printed by the variable printing mechanism 109 and which is to be entered into the accumulating mechanism 110, and for cooperation with the setup mechanism 112, each slide 111 has a pawl 140 pivoted thereto at 141 as will be evident in Fig. 12 and the pawls 140 are in each instance arranged to extend forwardly beyond the forward end edge 111S of the slide 111. Each pawl 140 terminates in a forward edge 140S and when the pawls 140 are disposed in their lower or horizontal positions shown in Fig. 12 of the drawings, the forward edge 140S is disposed opposite the rear edge of a stop plate 142. The stop plate 142 is mounted for rocking movement on a rock shaft 144 and a spring 145 normally urges the stop plate 142 into its upper or effective position as determined by an adjustable or settable stop 146. When the stop plate 142 is in its effective position of Fig. 12, the end edges 140S of the pawls 140 will normally engage the stop plate 142 when the restoring bail 131 is moved forwardly or to the left in Fig. 12, and the movement of a related slide bar 111 will in such an instance be relatively slight and the slide bar 111 will remain in its zero position. When a slide bar is to be set to a position respresentative of a significant digit, the pawl 140 thereof is pivoted in an upward direction so as to move their end edge 140S thereof out of alignment with the stop plate 142, and this is accomplished by the setup mechanism 112 in the course of the operation of such setup mechanism, as described in the aforesaid parent application.

As hereinafter pointed out, the accumulator structure of the present machine is constructed and arranged as a separate and individual unit that may be positioned on the machine frame within the slots 122 and beneath the slides 111. It has also been pointed out that the accumulator unit 110 has two relatively small side plates 120 and 121, and the details of construction of the accumulator unit are illustrated in Figs. 12 to 14. Thus the side plates 120 and 121 of the accumulator unit are held in spaced relation by a plurality of cross shafts and bars that also serve as mounting means for some of the elements of the mechanism as will hereinafter become apparent. Each of the three separate accumulators AC that are included in the unit 110 embodies a pair of end plates 355 that are supported in spaced relation by a mounting shaft 356, such mounting shaft being secured to each related end plate 355 by a stud 357 that in each instance carries a cam roller 358 just beyond the outer face of the related end plate 355. The cam rollers 358 are arranged to ride in vertical slots 359 formed in the side plates 120 and 121 of the accumulator unit and thus the shaft 356 may be moved and guided in a vertical direction. Such shaft 356 in each instance constitutes the mounting means for the accumulator wheels 360, one of which is provided for each of the orders of the machine, and these accumulator wheels are mounted on hubs 361 as will be evident in Fig. 14 of the drawings. The accumulator wheels or gears 360 are in the present case arranged to have twenty gear teeth, and two wide teeth 360W are provided at diametrically opposite position for use in accomplishing the carry-over function in the accumulator, as will hereinafter be explained.

The shaft 356 is in each instance arranged for vertical movement in the slots 359 by cams 363 that are mounted for rocking movement on a shaft 364 that is disposed in a downwardly spaced relation with respect to the related shaft 356, such shaft 364 in each instance being extended through the side plates 120 and 121 and being held in position by studs 365. At its left hand end, each shaft 364 has an enlarged extension 366, Fig. 14, which serves as a mounting means for a related control element, as will hereinafter be described. The end plates 355 of each accumulator have vertical slots 367 formed therein at their lower ends and these slots embrace the shaft 364 so as to cooperate with the guide slots 359 in guiding the accumulator assemblies for vertical movement by the cams 363. The cams 363 that are associated with a particular one of the accumulators have openings therein that embrace the shaft 364, and arms 363B formed on the cams 363 are connected by a relatively heavy cross bar 368 so that by operation of the cross bar 368, the cams 363 may be rocked in unison. A spring 369 acting on a projecting stud serves to normally urge the cams 363 in a counterclockwise direction, Fig. 13 so as to normally tend to move the related accumulator in a downward direction, that is to a lower position wherein the accumulator pinions 360 are out of engagement with respect to the slides 111. Such operation of the related accumulator is effected by a cam slot 363S formed in each of the cams 363 and arranged to engage the roller 358 at the adjacent end of the accumulator supporting shaft 356. The cam slot is so formed that when the cam 363 is in its most counterclockwise position, the accumulator will be in its lower position, while movement of the cams to their most clockwise position, against the action of the spring 369, serves to move the accumulator in an upward direction so as to engage the teeth 360T of the pinions 360 with complemental gear teeth 370 formed in the lower edge of the slides 111.

In the course of a downward or disengaging movement of the accumulator pinions 360, the teeth at the lower edge of such pinions are engaged with related carry-over segments 372 that are mounted on the mounting shaft 364, one such carry-over segment 372 being provided for each of the pinions 360, and such carry-over segments 372 being arranged and controlled in such a manner as to effect the necessary tens-transfer operation in the cycle of operation of the accumulator. Each carry-over segment 372 has teeth formed at the upper end of such segment and it is these teeth that are engaged by the teeth of the related pinion 360. The carry-over segments 372 are in each instance provided with an integral arm 372A that extends to the right as viewed in Fig. 13 so as to thereby pass below the bar 368 that connects the cams 363, and hence, when the cams 363 are rocked in a clockwise direction so as to raise the related accumulator, the bar 368 engages the arms 372A of the several carry-over segments so as to move the carry-over segments to their normal or restored positions as shown in Fig. 14. The carry-over segments 372 are individually latched in such restored positions by latch pawls 380 that are mounted for rocking movement on a transverse shaft 381 that is extended between the two side plates 120 and 121. Each latch pawl 380 is urged toward an effective position shown in Fig. 12 by a comb spring 382 that is mounted on a cross bar 383. The comb spring acts on the upper end of each latch pawl 380 so as to dispose the lower end of the latch pawl in an overlying relationship with respect to an upstanding tooth 373T formed on the arm 372A of the related carry-over segment 372.

The normal latching position of each latch pawl 380 is determined by an operating pawl 385 that is pivoted at its lower end on a transverse shaft 386 extended between the side plates 355 of the accumulator, and such pawls 385 are held in spaced relation by a comb 387 that is extended between the plates 355 so as to dispose the teeth of the comb between the respective pawls 385. Each pawl 385 has a notch 388 in its upper end that is arranged to engage the lower edge of a spacer bar 389 thereby to limit rocking movements of the pawl 385. The rear or right hand face of the pawl 385 is arranged to ride along a vertical surface formed on the upper end of the pawl 380, thereby to act on the pawl 380 at all times to tend to maintain the pawl limit the left hand movement of the upper end of the pawl 380. Each pawl 385 has a nose formed thereon at its upper end so as to project to the left in Fig. 14 and into the path of the thick tooth 360W of the pinion 360 that is allocated to the next lower order of the mechanism. Thus for example if the units order pinion 360 of the accumulator is so actuated that its wide tooth 360W engages the nose on the pawl 385, this pawl 385 will rock the latch 380 of the tens order in a clockwise direction from the position shown in Fig. 13, and when this is done, the carry-over segment 372 of the tens order will rock slightly in a counterclockwise direction to an extent that is limited by a shoulder 390 formed on a latch bar 391. One such latch bar 391 is provided for each accumulator and each such latch bar 391 is extended between the side plates 120 and 121 and is mounted for rocking movement on pivot 392 disposed adjacent to the upper edge of the latch bar 391. The carry-over segments 372 have an end projection or ear 372E formed at the ends of the arms 372A, and it is such ear that is disposed beneath the shoulder 390 of the latch bar 391. The carry-over segments 372 are normally urged in a counterclockwise direction by comb springs 394 mounted on rocking bars 395 and the tension applied to the springs 394 is such as to urge the ear 372E into engagement with the shoulder 390 when the related latch 380 is released.

It will be recognized that the release of the latch pawls 380 will in most instances take place while the related accumulator is in its upper position and in engagement with the slides 111, and this of course conditions the carry-over segments 372 for operation in introducing a carry-over into related accumulator pinion 360. The actual introduction of the carry-over amounts into the related pinions 360 of the accumulator takes place when the accumulator has been returned to its lower position wherein its several pinions 360 are engaged with the teeth of carry-over segments 372. Thus when the accumulator pinions 360 have been lowered, the latch bar 391 may be released, or in other words this latch bar may be rocked in a counterclockwise direction so as to disengage the shoulder 390 from the ears 372E of those carry-over segments 372 that have been enlarged or conditioned for operation. When this is to be done, the latch bar 391 is rocked counter-clockwise from the position shown in Fig. 13, and when this is done, the carry-over segment 372 rocks in a counterclockwise direction until the ear 372E engages a shoulder 391B on the bar 391. This introduces the desired carry-over into the related pinion 360. It will be recognized of course that such introduction of a carry-over into a related pawl may cause such pawl to move through its zero position, thereby to actuate the pawls 385 and 380 of the next higher order, and when this occurs, a similar carry-over action will be attained as to such next higher order. Such an action may be progressive through the several orders of the accumulator under some conditions or settings of the accumulator.

Figure 12A:
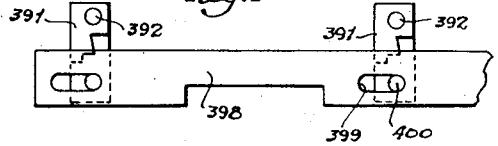
Fig. 12A is a detail view of certain of the parts shown in Fig. 12.

The rocking movement of the latch bars 391 is accomplished in unison with respect to all such latch bars and this is done by a link 398, Figs. 12, 12A and 13. The link 398 has slots 399 formed therein that engage pins 400 extended from the adjacent ends of the latch bars 391. The operating bar 398 has an arm 401 extended downwardly therefrom as viewed in Fig. 13, and a roller 402 on the arm 401 is disposed in a slot 403 formed on an upward projecting arm 404, Figs. 13 and 12. An arm 407 fixed on the cam shaft 108, Fig. 12, and the cam 409 is thus effective to release the latch bars 391 after the accumulators have been returned to their downward positions wherein they are engaged with the carry-over segments 372.

The carry-over springs 394 may of course be so arranged so as to have a fixed tension, this being accomplished by fixing the mounting bars 395 in a selected rotative position, but where the mechanism is embodied in a relatively large accumulator, that is, an accumulator having a large number of orders, the tension on the springs 394 is varied so that the restoring operation of the carry-over segments may be accomplished against a relatively light spring pressure while a heavy spring pressure is afforded during the time when the carry-over operations are to take place. For this purpose, each mounting bar 395 has a downwardly extending arm 406 fixed thereon, and each of these arms has a slot 407 formed therein which embraces a horizontal operating rod 408. Abutment collars 409 are provided on the rod 408 in a left hand direction, Fig. 13, added tension may be applied to all of the carry-over springs 394. Such operation of the rod 408 is accomplished by a bell crank 410 that is connected to the rod 408 at 411, and a cam roller 412 on the other arm of the bell crank 410 is arranged to bear upon the cam 413 fixed on the cam shaft 108.

As described in detail in my aforesaid application Serial No. 676,329, the cams 363 which engage and disengage the accumulators AC—1, AC—2 or AC—3 with respect to the associated racks 111 are actuated through rocking movements when their related accumulators are to be engaged or disengaged. When a pair of cams 363 is rocked clockwise, Fig. 13, the associated accumulator is raised into engagement with the racks 111, and at the same time, the accumulator is disengaged from the carry segments 372. As the clockwise rocking movement of the cams 363 progresses, the associated bar or rod 368 engages the tail portions 372A of any actuated carry segments 372 so as to restore such carry segments to their normal positions wherein they will be latched by the related latch pawls 380. Such restoring action on the carry segments is accomplished in opposition to the related comb spring 394, which at this time in the cycle will be subjected to a comparatively light tension by reason of the form of the tension applying cam 413.

From the foregoing description it will be evident that the accumulator mechanism of the present invention is advantageous in operation, particularly insofar as the restoring of the carry over mechanism is concerned, for the spring means of the carry over mechanism is lightly tensioned during the restoring period while heavy tension is afforded during carry over periods so as to thereby assure accuracy of operations. Moreover, the accumulator mechanism of the present invention is particularly rugged insofar as the carry-over mechanism may be concerned and has been found in this respect to be capable of withstanding long periods of sustained operation.

Thus, while I have illustrated and described the preferred embodiments of my invention, it is to be understood that this is capable of variation and modification and I therefore do not wish to be limited to the precise details set forth, but desire to avail ourselves of such changes and alterations as fall within the purview of the following claims.

I claim:

1. In an accumulator mechanism for accumulating variable multiple order numerical amounts, a plurality of set-up members longitudinally shiftable in one direction to set positions and in the other direction to restored or normal positions, each of said set-up members having a longitudinally extending rack formed thereon, a plurality of toothed members having their teeth facing toward but in spaced relation to said racks, an accumulator including pinions for each of a plurality of orders from a lowest order to a highest order and shiftably mounted for selective engagement with said racks or said toothed members, controlling means governing the shifting movement of said slides, shiftable pawls associated with at least certain of said pinions for individual actuation by the related one of said pinions in the next lower order when the pinion moves in one rotative direction through a predetermined rotative position, said toothed members in all but the lowest order constituting carry-over members and being adapted for limited carry over movement, a latch for each carry-over member operable to maintain its carry-over member in a predetermined normal position, means for releasing each such latch adapted to be actuated by the pawl associated with the pinion of the next lower order of said accumulator, a movably mounted spring anchor, spring means acting between said spring anchor and the respective carry-over members for actuating said carry-over members, restoring means for restoring said carry-over members to their normal positions against the action of the related spring means, and a cam and cam follower operable to move said spring anchor for varying the tension of said spring means to provide a light tension therein during periods when said latches are adapted to be released, and for imparting a relatively heavy tension to said spring means after the pinions of said accumulator have been engaged with said toothed members to introduce appropriate carry-overs into said accumulator.

2. In an accumulator mechanism for accumulating variable multiple order numerical amounts, a plurality of set-up members longitudinally shiftable in one direction to set positions and in the other direction to restored or normal positions, each of said set-up members having a longitudinally extending rack formed thereon, a plurality of toothed members having their teeth facing toward but in spaced relation to said racks, an accumulator including pinions for a plurality of orders from a lowest order to a highest order and shiftably mounted for selective engagement with said racks or said toothed members, controlling means governing the shifting movement of said slides, shiftable pawls associated with at least certain of said pinions for individual actuation by the related one of said pinions in the next lower order when the pinion moves through a predetermined rotative position, said toothed members in all but the lowest order constituting carry-over members and being adapted for limited carry over movement, a latch for each carry-over member operable to maintain its carry-over member in a predetermined normal position, means for releasing each such latch adapted to be actuated by the pawl associated with the pinion of the next lower order of said accumulator, spring means for actuating said carry-over members, means including a cam and cam follower operatively associated with said spring means to vary the tension of said spring means to provide a light tension therein during periods when said latches are adapted to be released, and to impart a relatively heavy tension to said spring means after the pinions of said accumulator have been engaged with said toothed members, and means operable to limit movement of said carry-over members to a relatively small amount at the time when the associated latches are released and thereafter to enable release of said carry-over members to move under said heavy tension of said spring means to introduce appropriate carry-overs into said accumulator.

3. In an accumulator mechanism, a plurality of longitudinally shiftable slides having racks thereon and a plurality of pivoted toothed members mounted in spaced relation, an accumulator having pinions for each of a plurality of orders from a highest order to a lowest order and having said pinions disposed between said racks and said toothed members for engagement selectively therewith, said toothed members in all but the lowest order constituting carry-over members, latches for holding said carry-over members in predetermined normal positions and each adapted for release by the pinion of the next lower order when such a pinion moves through a predetermined rotative position, spring means for urging said carry-over members through operative strokes to introduce carry-overs into the accumulator, tension-varying means for varying the tension of said spring means, and means including a cam and cam follower operatively connected to said tension-varying means to apply a light tension to said carry-over members at the time when said latches are adapted to be released and operable thereafter to apply a heavier tension to said carry-over members for moving the same through their operative strokes.

WALTER T. GOLLWITZER.

REFERENCES CITED

The following references are of record in the file of this patent:

UNITED STATES PATENTS

| Number | Name | Date |
|---|---|---|
| 964,026 | Jacobs | July 12, 1910 |
| 1,810,213 | Johantgen | June 16, 1931 |
| 2,153,299 | Dahlberg | Apr. 4, 1939 |
| 2,158,142 | Muller | May 16, 1939 |
| 2,221,861 | Butler | Nov. 19, 1940 |
| 2,315,908 | Starrett | Apr. 6, 1943 |